(12) United States Patent
Inoue et al.

(10) Patent No.: US 12,082,077 B2
(45) Date of Patent: Sep. 3, 2024

(54) WIRELESS COMMUNICATION SYSTEM AND WIRELESS COMMUNICATION METHOD (71) Applicant: NIPPON TELEGRAPH AND TELEPHONE CORPORATION, Tokyo (JP)

(72) Inventors: Yasuhiko Inoue, Musashino (JP); Shoko Shinohara, Musashino (JP); Takafumi Hayashi, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 341 days.

(21) Appl. No.: 17/603,390

(22) PCT Filed: Apr. 13, 2020

(86) PCT No.: PCT/JP2020/016351
§ 371 (c)(1),
(2) Date: Oct. 13, 2021

(87) PCT Pub. No.: WO2020/213579
PCT Pub. Date: Oct. 22, 2020

(65) Prior Publication Data
US 2022/0217504 A1 Jul. 7, 2022

(30) Foreign Application Priority Data
Apr. 16, 2019 (JP) .................................. 2019-078172

(51) Int. Cl.
H04W 4/06 (2009.01)
H04L 1/00 (2006.01)
(Continued)

(52) U.S. Cl.
CPC ............. *H04W 4/06* (2013.01); *H04L 1/0003* (2013.01); *H04L 1/0006* (2013.01);
(Continued)

(58) Field of Classification Search
CPC ..... H04W 4/06; H04W 74/085; H04W 84/12; H04W 92/12; H04L 1/0003; H04L 1/0006;
(Continued)

(56) References Cited

U.S. PATENT DOCUMENTS

2008/0254802 A1* 10/2008 Ohta ...................... H04W 36/08
455/440
2012/0300732 A1* 11/2012 Ode ...................... H04W 72/30
370/329
(Continued)

FOREIGN PATENT DOCUMENTS

JP 2015041898 A 3/2015
JP 2015159350 A 9/2015
(Continued)

OTHER PUBLICATIONS

The 802.11 Working Group of the LAN/MAN Standards Committee of the IEEE Computer Society, Part 11: Wireless LAN Medium Access Control (MAC) and Physical Layer (PHY) Specifications, IEEE Std 802.11-2016, IEEE Standard for Information technology—Telecommunications and information exchange between systems Local and metropolitan area networks—Specific requirements, Dec. 2016.

*Primary Examiner* — Thinh D Tran
(74) *Attorney, Agent, or Firm* — Harness, Dickey & Pierce, P.L.C.

(57) ABSTRACT

A wireless communication system includes a plurality of transmission devices configured to receive broadcast/multicast data transmitted from a broadcast/multicast data trans-
(Continued)

mission device, convert the broadcast/multicast data into wireless frames, and broadcast/multicast the wireless frames to a plurality of reception devices, and the plurality of reception devices configured to receive the wireless frames broadcasted/multicasted from the plurality of transmission devices and acquire the broadcast/multicast data, and each of the plurality of transmission devices includes a broadcast/multicast transmission unit configured to generate the same wireless frame from the broadcast/multicast data and broadcast/multicast the generated wireless frame at the same transmission timing using the same MCS.

4 Claims, 6 Drawing Sheets

(51) Int. Cl.
  *H04L 5/00* (2006.01)
  *H04W 74/0833* (2024.01)
(52) U.S. Cl.
  CPC .......... *H04L 5/0044* (2013.01); *H04L 5/0082* (2013.01); *H04W 74/085* (2013.01)

(58) Field of Classification Search
  CPC ... H04L 5/0044; H04L 5/0082; H04L 1/0009; Y02D 30/70
  See application file for complete search history.

(56) References Cited

U.S. PATENT DOCUMENTS

| | | | |
|---|---|---|---|
| 2015/0282203 A1* | 10/2015 | Liu | H04W 72/542 370/329 |
| 2017/0127306 A1* | 5/2017 | Tan Bergström | H04W 24/10 |
| 2017/0142753 A1 | 5/2017 | Wang et al. | |
| 2017/0303276 A1* | 10/2017 | Cheng | H04L 1/0002 |
| 2018/0062713 A1* | 3/2018 | Adachi | H04W 16/28 |
| 2018/0184456 A1 | 6/2018 | Subramani et al. | |
| 2018/0205434 A1* | 7/2018 | Cherian | H04B 7/0452 |

FOREIGN PATENT DOCUMENTS

| | | |
|---|---|---|
| JP | 2017526274 A | 9/2017 |
| WO | WO-2011099135 A1 | 8/2011 |
| WO | WO-2016178417 A1 | 11/2016 |
| WO | WO-2016186540 A1 | 11/2016 |
| WO | WO-2018136216 A1 | 7/2018 |

* cited by examiner

WIRELESS COMMUNICATION SYSTEM AND WIRELESS COMMUNICATION METHOD

CROSS-REFERENCE TO RELATED APPLICATIONS

This application is a 371 U.S. National Phase of International Application No. PCT/JP2020/016351 filed on Apr. 13, 2020, which claims priority to Japanese Application No. 2019-078172 filed on Apr. 16, 2019. The entire disclosures of the above applications are incorporated herein by reference.

TECHNICAL FIELD

The present disclosure relates to a wireless communication system and a wireless communication method for performing a broadcast/multicast service through broadcast/multicast communication.

BACKGROUND ART

Examples of the most widely used wireless communication systems that perform autonomous distributed access control include a wireless LAN system based on the IEEE 802.11 standard (Non Patent Literature 1).

Typical examples of a service of simultaneously transmitting data to a plurality of destinations include broadcast and multicast. In an IEEE802.11 wireless LAN system, a method of handling group-addressed data, that is, data addressed to a plurality of terminals, is determined. In the IEEE802.11 standard, "10.3.6 Group addressed MPDU transfer procedure" includes regulations related to a basic transfer procedure for broadcast/multicast data, and "11.2 Power management" includes regulations related to a data transfer procedure in a case where a terminal device is operated in a power saving mode.

Figure 5:
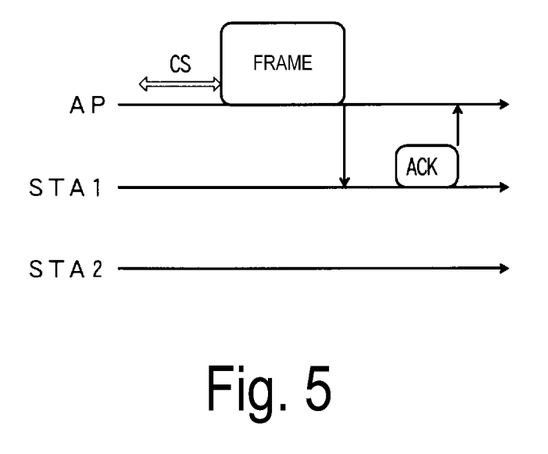
FIG. 5 is a diagram illustrating a frame transfer procedure when a unicast frame is transmitted.

FIG. 5 illustrates a frame transfer procedure when a typical unicast frame in the IEEE802.11 standard is transmitted. When an AP transmits a unicast frame in accordance with an access control procedure and an STA receives the unicast frame normally, the STA returns an ACK.

Figure 6:
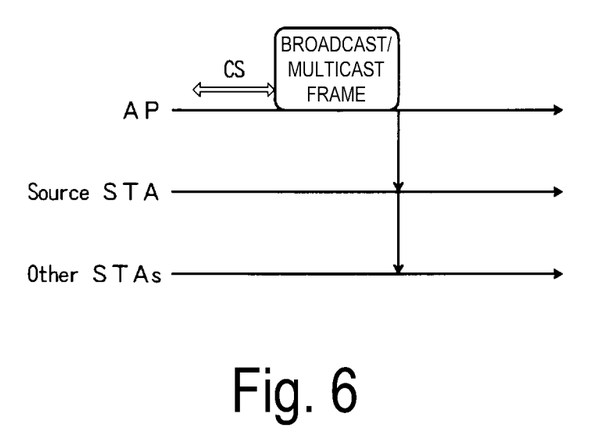
FIG. 6 is a diagram illustrating a procedure of transmitting a broadcast/multicast frame.

FIG. 6 illustrates a procedure of transmitting a broadcast/multicast frame in the IEEE802.11 standard. An AP transmits a broadcast/multicast frame in accordance with the same access control procedure as that when the AP transmits a unicast frame. However, an STA does not return an ACK even when the STA has received the unicast frame normally. This is because a broadcast/multicast frame is transmitted to a plurality of STAs, and returning an ACK from each STA may cause a collision. Thus, in broadcast/multicast communication, there is no procedure of returning a response after transmission of a frame, which reduces the quality of communication and reliability as compared to unicast communication.

CITATION LIST

Non Patent Literature

Non Patent Literature 1: IEEE Std 802.11-2016

SUMMARY OF THE INVENTION

Technical Problem

In a case where communication is performed only unidirectionally in broadcast/multicast communication, there is no response frame from a communication partner serving as a destination as compared to a case where communication is performed bidirectionally. Thus, it is not possible to obtain feedback information such as whether or not communication has been successful or the current state of communication quality. For this reason, in the current circumstances, there is a problem in that, even when a wireless frame is transmitted, the content cannot be received normally due to the frequent occurrence of frame errors caused by a poor communication environment, such as a propagation path, or conversely, an excessively low-speed rate for reducing a frame error rate results in reduction in capacity.

An object of the present disclosure is to provide a wireless communication system and a wireless communication method that are capable of improving communication quality and reliability even in the case of unidirectional communication in broadcast/multicast communication.

Means for Solving the Problem

A first invention is a wireless communication system including a plurality of transmission devices configured to receive broadcast/multicast data transmitted from a broadcast/multicast data transmission device, convert the broadcast/multicast data into wireless frames, and broadcast/multicast the wireless frames to a plurality of reception devices, and the plurality of reception devices configured to receive the wireless frames broadcasted/multicasted from the plurality of transmission devices and acquire the broadcast/multicast data, in which each of the plurality of transmission devices includes a broadcast/multicast transmission unit configured to generate the same wireless frame from the broadcast/multicast data and broadcast/multicast the generated wireless frame at the same transmission timing using the same MCS.

The wireless communication system according to the first invention further includes a control device connected to the broadcast/multicast data transmission device and the plurality of transmission devices, the control device includes a unit configured to calculate an interval of a transmission timing in each transmission device in accordance with a data rate of the broadcast/multicast data transmitted from the broadcast/multicast data transmission device and an amount of data to be transmitted at one time in accordance with an MCS of each transmission device, and notify the plurality of transmission devices of the calculated interval.

In the wireless communication system according to the first invention, the broadcast/multicast transmission unit of each of the plurality of transmission devices is configured to set a random back-off value in random access control to a common fixed value, and to start to transmit the wireless frame at the transmission timing when a signal is not detected through carrier sensing.

In the wireless communication system according to the first invention, the control device includes a unit configured to notify the plurality of transmission devices of a common parameter value to be set in each field of a MAC header of the wireless frame.

In the wireless communication system according to the first invention, the plurality of transmission devices each include a unit configured to notify the control device of received power values of mutually received beacon signals, and the control device includes a unit configured to calculate the MCS in accordance with the received power values of the respective transmission devices and notify the plurality of transmission devices of the calculated MCS.

A second invention is a wireless communication method including by a plurality of transmission devices, receiving broadcast/multicast data transmitted from a broadcast/multicast data transmission device, converting the broadcast/multicast data into wireless frames, and broadcasting/multicasting the wireless frames to a plurality of reception devices, and by the plurality of reception devices, receiving the wireless frames broadcasted/multicasted from the plurality of transmission devices and acquiring the broadcast/multicast data, in which each of the plurality of transmission devices generates the same wireless frame from the broadcast/multicast data and broadcasts/multicasts the generated wireless frame at the same transmission timing using the same MCS.

Effects of the Invention

According to the present disclosure, broadcast/multicast data transmitted from a broadcast/multicast data transmission device is broadcasted/multicasted as the same wireless frame from each of a plurality of transmission devices at the same transmission timing using the same MCS, and each reception device receives the same wireless frames in a superimposed manner. This increases an apparent received power value and improves an SINR, whereby it is possible to increase communication capacity.

DESCRIPTION OF EMBODIMENTS

Figure 1:
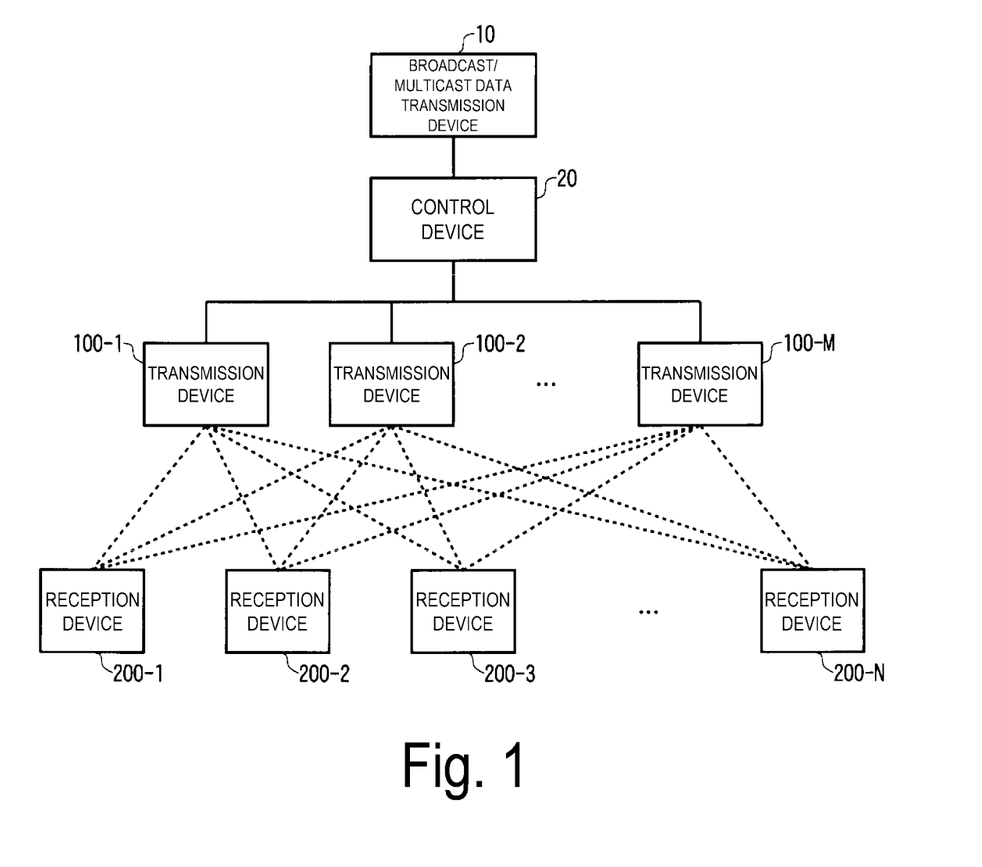
FIG. 1 is a diagram illustrating a configuration of an example of a wireless communication system of the present disclosure.

FIG. 1 illustrates a configuration of an example of a wireless communication system of the present disclosure.
In FIG. 1, a broadcast/multicast data transmission device 10 such as a content server outputs broadcast/multicast data to be broadcasted or multicasted, and transfers the broadcast/multicast data to a plurality of transmission devices 100-1 to 100-M through a control device 20. The transmission devices 100-1 to 100-M each convert input broadcast/multicast data into a wireless frame and broadcast/multicast the wireless frame toward reception devices 200-1 to 200-N. Reception devices designated by a group address receive the wireless frames.

Figure 2:
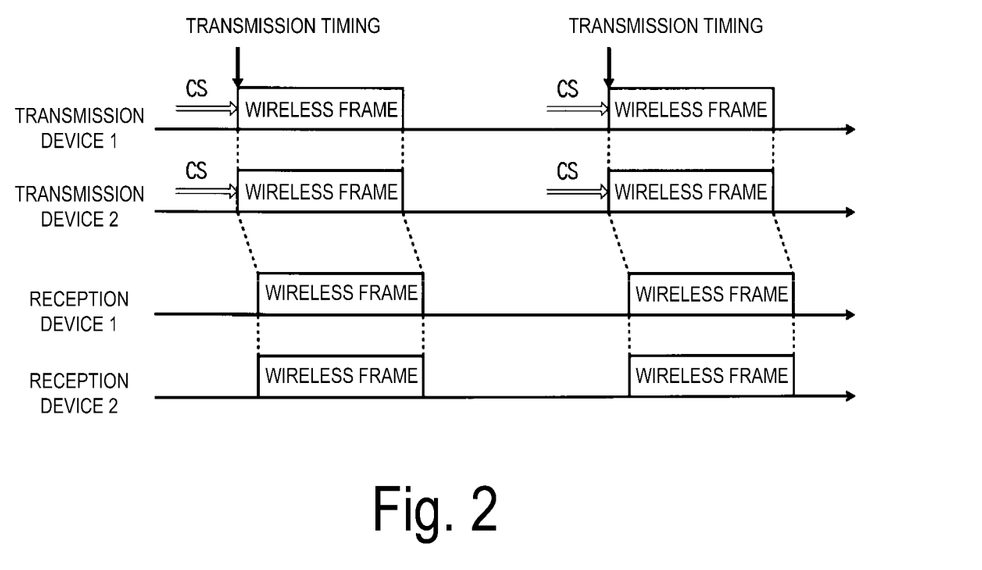
FIG. 2 is a timing chart illustrating an example of broadcast/multicast transmission of the wireless communication system of the present disclosure.

The present disclosure is characterized in that the plurality of transmission devices 100-1 to 100-M each generate the same wireless frame from the broadcast/multicast data and broadcast/multicast the generated wireless frame at the same transmission timing using the same modulation and coding system (MCS). For example, as illustrated in FIG. 2, when transmission devices 1 and 2 transmit the same wireless frames at the same transmission timing using the same MCS, reception devices 1 and 2 receive the same wireless frames from the transmission devices 1 and 2 in a superimposed manner. Thereby, in the reception devices 1 and 2, an apparent received power value is increased, and an SINR can be improved.

Here, the same transmission timing, the same wireless frame, and the same MCS will be described.
With Regard to Same Transmission Timing
In order for each reception device to receive a plurality of wireless frames from a plurality of transmission devices in a superimposed manner and to perform reception processing on the wireless frames as one wireless frame, the transmission timings of the wireless frames from the plurality of transmission devices need to be the same. Note that, strictly speaking, the reception devices need to simultaneously receive the wireless frames transmitted from the plurality of transmission devices. However, if the plurality of transmission devices simultaneously transmit the wireless frames, a difference in reception time between the reception devices can be absorbed during the reception processing of the wireless frames.

In the configuration of FIG. 1, the control device 20 determines transmission timing of the respective transmission devices 100-1 to 100-M and notifies the transmission devices of the transmission timing. The transmission timing may be a relative time or may be an absolute time. The control device 20 calculates the interval of the transmission timing in each transmission device based on the data rate of broadcast/multicast data of the broadcast/multicast data transmission device 10 and the amount of data to be transmitted at one time by the transmission device. For example, when the data rate of the broadcast/multicast data is set to 2 Mbps, and the amount of data to be transmitted at one time in accordance with the MCS is set to 1500 bytes×10 packets, the interval of the transmission timing is 1500×8×10/(2× $10^6$)=0.06 (sec).

Note that this transmission timing indicates the time when a wireless frame starts to be transmitted from an antenna of the transmission device. In a wireless communication system such as a wireless LAN for performing CSMA/CA control in an unlicensed band, carrier sensing is performed before a transmission timing, and random back-off control is performed when a signal transmitted by another device is not detected on a channel. A wireless frame is transmitted when no signal is detected. Thus, it is necessary to set a random back-off value to the same fixed value in the plurality of transmission devices and also use the same carrier sensing time (CS) as illustrated in FIG. 2.

With Regard to Same Wireless Frame and Same MCS In order that a plurality of wireless frames received in a superimposed manner by each reception device are demodulated as the same frame, for example, wireless frames of OFDM communication should be received at the same symbol position in the same phase. For this, it is necessary to align bit strings of the frames before demodulation in the plurality of transmission devices.

In the configuration illustrated in FIG. 1, the control device 20 notifies the transmission devices 100-1 to 100-M of a common parameter value to be set in each field of a MAC header of the wireless frame generated from broadcast/multicast data. For example, a MAC address and a BSSID of an individual transmission device are typically set in a transmission address field. However, in a case where the same wireless frame in the present disclosure is generated, a common value is set in the transmission address field. In addition, the transmission devices each do not manage a sequence control value, and the control device 20 sets a sequence number uniquely designated from, for example, an ID of the broadcast/multicast data transmission device 10 and an ID of a traffic flow as a sequence control value. Further, in a case where fragmentation is performed, the control device 20 designates the size thereof in each of the transmission devices. When such designation is performed, the size may be a specified fixed value or may be a given set value.

Further, in order for the reception devices to receive wireless frames at the same symbol position in the same phase, it is also necessary to use the same MCS in the respective transmission devices. First, the transmission devices 100-1 to 100-M observe received power values of mutually received beacon signals and calculate approximate distances. The intermediate point of the calculated distances is a point where a total received power value is minimized. For this reason, the transmission devices each obtain an SINR taking device noise into account in consideration of a power value at this point, and select an MCS with which the error rate is considered to be sufficiently small. Each transmission device notifies the control device 20 of the obtained MCS. Then, the control device 20 selects the MCS with the lowest error rate and notifies the transmission devices of the selected MCS as a common parameter. Alternatively, the transmission devices may notify the control device 20 of the observed received power values, and the control device 20 performs the above-described processing, calculates a common MCS, and notifies the transmission devices of the calculated MCS. Then, the transmission devices broadcast/multicast wireless frames using the notified MCS. Note that, in a case where the transmission devices cannot mutually observe the received power values, the transmission devices may be notified of an MCS set by the control device 20.

Figure 3:
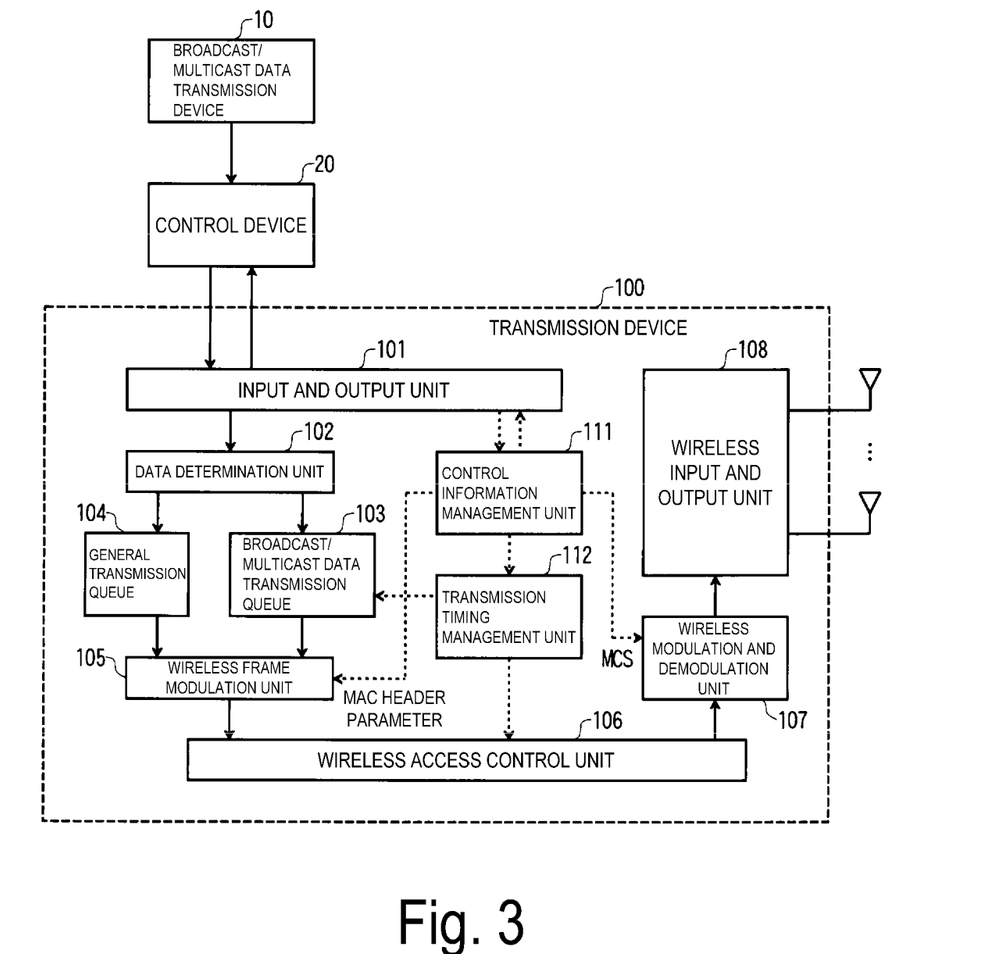
FIG. 3 is a diagram illustrating a configuration example of a transmission device 100.

FIG. 3 illustrates a configuration example of the transmission device 100.

In FIG. 3, an input and output unit 101 of the transmission device 100 outputs data transferred from a high-level device to a data determination unit 102. The data determination unit 102 determines input data. When the input data is broadcast/multicast data transmitted from the broadcast/multicast data transmission device 10, the data determination unit 102 outputs the input data to a broadcast/multicast data transmission queue 103. When the input data is other data, the data determination unit 102 outputs the input data to a general transmission queue 104. Note that, in a case where the transmission device 100 receives only broadcast/multicast data from the broadcast/multicast data transmission device 10 at all times (for example, in a case where the transmission device 100 is a transmission device dedicated to broadcasting), the data determination unit 102 and the general transmission queue 104 are not necessary. A transmission source ID indicating the broadcast/multicast data transmission device 10 is set in the broadcast/multicast data, and the transmission source ID is stored as, for example, a transmission source address of a wireless frame in which the broadcast/multicast data is stored.

A wireless frame modulation unit 105 modulates the broadcast/multicast data stored in the broadcast/multicast data transmission queue 103 or the data stored in the general transmission queue 104 in accordance with a wireless frame format. In a case where a wireless access control unit 106 acquires a transmission right through an access procedure corresponding to each queue by CSMA/CA or the like, the wireless access control unit 106 extracts data stored in the corresponding queue and transmits the data as a wireless frame through a wireless modulation and demodulation unit 107 and a wireless input and output unit 108.

In a case where the control device 20 notifies a control information management unit 111 of a transmission timing of the wireless frame, information on a MAC header, information on an MCS, and the like, the control information management unit 111 notifies each of a transmission timing management unit 112, the wireless frame modulation unit 105, and the wireless modulation and demodulation unit 107 of the notified information. The wireless frame modulation unit 105 generates the same wireless frame to be broadcasted/multicasted by each transmission device based on the notified information of the MAC header. The transmission timing management unit 112 extracts broadcast/multicast data from the broadcast/multicast data transmission queue 103 in accordance with the transmission timing, and controls the wireless access control unit 106 to start wireless access control in accordance with the transmission timing. At the time of transmitting the wireless frame, the wireless modulation and demodulation unit 107 performs modulation and coding processing by using the MCS common in the transmission devices.

Figure 4:
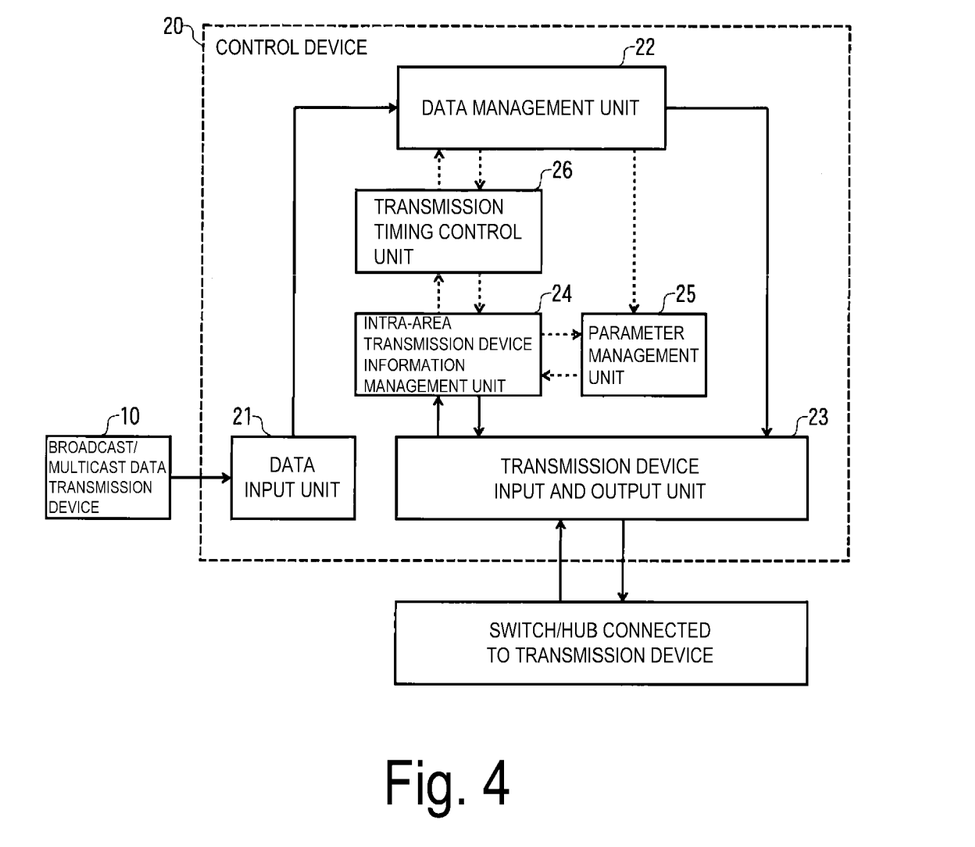
FIG. 4 is a diagram illustrating a configuration example of a control device 20.

FIG. 4 illustrates a configuration example of the control device 20.

In FIG. 4, the control device 20 is configured such that a data input unit 21 receives broadcast/multicast data transmitted by the broadcast/multicast data transmission device 10, and a data management unit 22 including a buffer function manages the broadcast/multicast data and transfers the broadcast/multicast data to the transmission devices through a transmission device input and output unit 23. An intra-area transmission device information management unit 24, a parameter management unit 25, and a transmission timing control unit 26 collect information necessary for each transmission device to generate the same wireless frame from broadcast/multicast data and transmit the generated wireless frame at the same transmission timing using the same MCS. Then, the intra-area transmission device information management unit 24 notifies, through the transmission device input and output unit 23, each transmission device of the transmission timing of the wireless frame, the information of the MAC header, and the information of the MCS which are generated as described above.

REFERENCE SIGNS LIST

10 Broadcast/multicast data transmission device
20 Control device
21 Data input unit
22 Data management unit
23 Transmission device input and output unit
24 Intra-area transmission device information management unit
25 Parameter management unit
26 Transmission timing control unit
100 Transmission device
101 Input and output unit
102 Data determination unit
103 Broadcast/multicast data transmission queue
104 General transmission queue
105 Wireless frame modulation unit
106 Wireless access control unit
107 Wireless modulation and demodulation unit
108 Wireless input and output unit
111 Control information management unit
112 Transmission timing management unit

The invention claimed is:

1. A wireless communication system comprising:
a plurality of transmission devices configured to receive broadcast/multicast data transmitted from a broadcast/multicast data transmission device, convert the broadcast/multicast data into wireless frames, and broadcast/multicast the wireless frames to a plurality of reception devices;
the plurality of reception devices configured to receive the wireless frames broadcasted/multicasted from the plurality of transmission devices and acquire the broadcast/multicast data,
wherein each of the plurality of transmission devices includes a broadcast/multicast transmission unit configured to generate the same wireless frame from the broadcast/multicast data and broadcast/multicast the generated wireless frame at the same transmission timing using the same MCS,
a control device interconnected between the broadcast/multicast data transmission device and each of the plurality of transmission devices, wherein the control device includes a unit configured to calculate an interval of a transmission timing in each transmission device in accordance with a data rate of the broadcast/multicast data transmitted from the broadcast/multicast data transmission device and an amount of data to be transmitted at one time in accordance with an MCS of each transmission device, and notify the plurality of transmission devices of the calculated interval,
wherein the plurality of transmission devices each include a unit configured to notify the control device of received power values of mutually received beacon signals, and
the control device includes a unit configured to calculate the MCS in accordance with the received power values of the respective transmission devices and notify the plurality of transmission devices of the calculated MCS.

2. The wireless communication system according to claim 1, wherein the control device determines a common fixed value and notifies the plurality of transmission device of the common fixed value; and the broadcast/multicast transmission unit of each of the plurality of transmission devices is configured to set a random back-off value in random access control to the common fixed value, and to start to transmit the wireless frame at the transmission timing when a signal is not detected through carrier sensing.

3. The wireless communication system according to claim 1, wherein the control device includes a unit configured to notify each of the plurality of transmission devices of a common parameter value to be set in a transmission address field of a MAC header of the wireless frame.

4. The wireless communication system according to claim 3, wherein the control device further notifies each of the plurality of transmission devices of a sequence number to be set in the wireless frame, where the sequence number is uniquely derived from an identifier of the broadcast/multicast data transmission device.

* * * * *